United States Patent [19]

Kadkade

[11] Patent Number: 4,819,373
[45] Date of Patent: Apr. 11, 1989

[54] METHOD OF THINNING FRUITLETS OR FRUITS OF CROPS

[75] Inventor: Prakash G. Kadkade, Marlboro, Mass.

[73] Assignee: GTE Laboratories Incorporated, Waltham, Mass.

[21] Appl. No.: 516,401

[22] Filed: Jul. 22, 1983

[51] Int. Cl.$^4$ .............................................. A01G 1/00
[52] U.S. Cl. ..................................... 47/58; 47/DIG. 6
[58] Field of Search ............................... 47/58, DIG. 6

[56] References Cited

U.S. PATENT DOCUMENTS

| | | | |
|---|---|---|---|
| 4,041,642 | 8/1977 | Krugler et al. | 47/DIG. 6 |
| 4,060,933 | 12/1977 | Kadkade | 47/58 |
| 4,109,414 | 8/1978 | Kadkade | 47/58 |

FOREIGN PATENT DOCUMENTS 2481883  11/1981  France ............................ 47/DIG. 6

OTHER PUBLICATIONS

Campbell, L. E. et al. (1975) "Spectral Radiant Power of Lamps Used in Horticulture" (reprint from) *Transactions of the ASAE*, vol. 18, No. 5, pp. 952–956.
Bickford, E. D., et al. (1973) *Lighting for Plant Growth* Kent State University Press, pp. 58,59 and 204–211 cited only.
Morrel, D. J. et al., (1969) "Environmental Regulation of Experimental Leaf Abscission" *Indiana Academy of Science*, Proceedings, vol. 78, 1969, pp. 146–160.
Hall, W. C. et al., (1956) "Effect of Radiation and Growth Regulators on Leaf Abscission in Seedling Cotton and Bean" *Plant Physiology*, vol. 31, No. 6, Nov. 1956.
Byers, E. K. 1978: Chemical Thinning of Spar 'Golden Delicious' and 'Starkrimson Delicious' with Sevin and Vydate, Hortscience 13 (1), 59–61.
Rogers, B. L. and Thompson, A. H. 1969: Chemical Thinning of Apple Trees Using Concentract Sprays, J. Amer. Soc. Hort. Sci 94, 23–25.
Cibulsky, R. J. 1979: Thinning Effects of GA$_3$ and Ethephon on Six Peach Varieties, PGRWG Proceedings 6, 1730179.
Sefick, H. J. 1975: Hand Thinning of Peaches, The Peach, ed. by N. F. Childers, pp. 270–275.
Buchanan, D. W., Biggs, R. H., Blake, J. A. and Sherman, W. B. 1970: Peach Thinning with 3-CPA and Ethrel during Cytokinesis, J. Amer. Soc. Hort. Sci. 95, 781–784.
Stenbridge, G. E. and Gambrell, C. E. 1971, Thinning Peaches with Bloom and Postbloom Applications of 2-Chloroethyl Phosphonic Acid J. Amer. Hort. Sci. 96(1), 7–9.

*Primary Examiner*—James R. Feyrer
*Attorney, Agent, or Firm*—Fred Fisher

[57] ABSTRACT

A process for thinning fruitlets or fruits by exposing the crops to far-red night-break lighting treatments at certain stages of flower and fruit growth and development.

1 Claim, No Drawings

METHOD OF THINNING FRUITLETS OR FRUITS OF CROPS

CROSS-REFERENCE TO RELATED APPLICATIONS

This application is related to co-pending U.S. patent applications, filed by the applicant: Ser. No. 472,449 filed Mar. 7, 1983 entitled "Method of Inhibiting Premature Budding of Short-Day Floral Crops", now U.S. Pat. No. 4,788,793, Ser. No. 476,080 filed Mar. 17, 1983 entitled "Application of Specific Lighting Treatments for Promotion of Anthocyanin in Economically Important Crops", Ser. No. 514,920, filed July 13, 1983 entitled "Method of Expediting Sugar Accumulation in Fruits of Economically Important Crops", now abandoned, and Ser. No. 516,401, filed concurrently herewith entitled "Method of Accelerating Dehiscence and of Reducing "Pull Force" in Fruits".

BACKGROUND OF THE INVENTION

1. Field of the Invention

This invention relates to a method of thinning fruitlets or fruits, and, in particular, to a non-chemical method of thinning fruit. Accordingly, it is a general object of this invention to provide new and improved methods of such character.

2. Description of the Prior Art

Prior art techniques for thinning fruitlets or fruits generally involved either hand thinning or the use of chemical growth regulators, such as Sevin, Vydate, ethrel, gibberellic acid, and naphthaleneacetic acid.

Chemical regulators that have been used by growers have not met their requirements of reasonable cost and practicability of application. Moreover, they tended to exhibit variable thinning response and often produced adverse side effects on fruits, and subsequent tree growth and development. Hand thinning and/or hose plus hand thinning has been time-consuming and very expensive, and it was often done at a time when return bloom could no longer be influenced.

3. Information Disclosure Statement

As a means of complying with the duty of disclosure set forth in 37 CFR 1.56, the following is a listing of patents and publications which may be pertinent. This statement shall not be construed as a representation that a search has been made or that no better art exists.

| U.S. Pat. No. | Patentee | Issue Date |
|---|---|---|
| 4,060,933 | Prakash G. Kadkade | 12/6/77 |
| 4,109,414 | Prakash G. Kadkade | 8/29/78 |

The patentee of the foregoing patents is the applicant of this invention.

Kadkade, U.S. Pat. No. 4,060,933, discloses a method for stimulating organogenesis of explants in a tissue culture by illuminating the explant during at least a portion of its differentiation stage with light having a predominant spectral emission at a wavelength at approximately 660 nm.

Kadkade, U.S. Pat. No. 4,109,414, discloses a method for controlling abscission of plant parts by illuminating the plants during the night period with light having a wavelength selected from the group consisting of wavelengths in the order of 420 nm, 550 nm, 660 nm, and 740 nm.

The following publications may be of interest to the reader:

Byers, E. K. 1978: Chemical thinning of spar 'Golden Delicious' and 'Starkrimson Delicious' with Sevin and Vydate. Hortscience 13 (1), 59–61.

Rogers, B. L. and Thompson, A. H. 1969: Chemical thinning of apple trees using concentrate sprays. J. Amer. Soc. Hort. Sci. 94, 23–25.

Cibulsky, R. J. 1979: Thinning effects of $GA_3$ and ethephon on six peach varieties. PGWG Proceedings 6, 173–179.

Sefick, H. J. 1975: Hand thinning of peaches. The peach, ed., by N. F. Childers. pp. 270–275.

Buchanan, D. W., Biggs, R. H., Blake, J. A. and Sherman, W. B. 1970: Peach thinning with 3-CPA and ethrel during cytokinesis, J. Amer. Soc. Hort. Sci. 95, 781–784.

Stenbridge, G. E. and Gambrell, C. E. 1971. Thinning peaches with bloom and postbloom applications of 2-chloroethyl phosphonic acid. J. Amer. Hort. Sci. 96 (1), 7–9.

Fortes, G. R. and Ducrouet, H. J. 1979. Effect of some growth regulators as affecting fruit thinning in Cascuta nectarine. PGRWG Proceedings 6: 242–249.

SUMMARY OF THE INVENTION

Another object of this invention is to provide a new and improved method of thinning fruitlets or fruits of economically important crops, through the use of night-break lighting treatments, without causing either any phytotoxicity or adverse effects on normal growth and development of crops.

Yet another object of this invention is to provide a new and improved method of thinning fruitlets or fruits of economically important crops through the use of lights that can be applied and removed at any time without the complications arising from the residual amounts of the exogenous stimulus remaining in the plant tissue and soil.

In accordance with one embodiment of this invention, a method of thinning fruitlets or fruits of crops includes exposing the crops to far-red night-break lighting at certain stages of flower and fruit growth and develoment. In accordance with certain features of the invention, the crops can be bean, almond, peach, nectarine, apricot, apple, or citrus. Bean crops can be of the variety "Dark Red Kidney". Almond crops can be of the varieties "Nonpareil" and "Merced". The "Dark Red Kidney" bean crops can be exposed to far-red night-break lighting with fluorescent and high-intensity-discharge light having a $\lambda$-emission peak centered around 740 nm and/or 760 nm, its intensity lying within the range 25 $\mu W/cm^2$ to 150 $\mu W/cm^2$. The light can be applied for two hours per night, from 11 p.m. to 1 a.m., commencing about ten days prior to full bloom of the fruits. The almond crops can be exposed to far-red night-break lighting with light provided from far-red emitting high-intensity-discharge potassium mercury lamps. The lamps can have a 1500 watt rating, and further include a synthetic resin material filter associated with each lamp so as to eliminate emissions therefrom below 700 nm. The light can have an intensity of 0.1 $\mu w/cm^2$ to 100 $\mu W/cm^2$ and be applied for a period of four hours per night, from 9 p.m. to 1 a.m., the lighting being initiated around full bloom to 5 percent bloom of flower development.

DESCRIPTION OF PREFERRED EMBODIMENT(S)

One of the primary reasons for thinning of flowers or fruits is to maintain a uniform yield (regular annual bearing) every year. Another advantage of thinning of fruits is to increase the harvest size of persisting fruit by a marked early reduction in fruit set. Thinning also reduces limb breakage, promotes general crop vigor, and increases the effectiveness of pest control program.

Hand thinning of fruits and fruitlets is expensive. The labor involved in thinning is next only to harvesting in cost per acre, insofar as labor costs to the farmer is concerned. Due to the rising costs of labor, interest in and research with chemical thinners have been conducted for approximately three decades.

As chemical thinners often present undesired side effects on fruit and crop growth, the influence of night-break lighting treatment on thinning of fruits was investigated using selected crops grown under greenhouse (model crop—Dark Red Kidney bean) and field (almond-var. "Nonpareil" and "Merced") conditions.

Bean (*Phaseolus vulgaris*—var. "Dark Red Kidney") plants were exposed to night-break lighting with far-red (fluorescent or HID: λ-emission peak centered around 740 nm and/or 760 nm respectively; intensity 25 $\mu$W/cm$^2$–150 $\mu$W/cm$^2$) lights for 2 hours every night (11 p.m. –1 a.m.). Night-break lighting treatment was started approximately 10 days prior to full bloom.

The modification of phytochrome promoting the thinning of flowers or fruitlets is important in the facilitation of mechanical harvesting. Night-break light treatment with far red (740 nm: 150 $\mu$W/cm$^2$) lights for 120 minutes enhances fruit thinning by 49 percent relative to controls. The magnitude of fruit thinning in red kidney beans receiving night-break exposure with far-red (760 nm: 150 $\mu$W/cm$^2$) lights was almost comparable to that observed with groups exposed to far-red radiation and peaking maximally at 740 nm. These findings indicate that night-break exposure with far-red lights peaking at 760 nm had no greater effect than far-red lighting at 740 nm on fruit thinning in red kidney beans.

Table I, below, indicates the effect of night-break lighting, at 740 nm, with an intensity of 100 $\mu$W/cm$^2$ on the delivery schedule on the pod drop in beans (var. "Red Kidney Beans").

TABLE I

| Treatment | Sample Size | Average Total No. of Pods Thinned/Plant | Relative Percent Pod Thinned |
|---|---|---|---|
| Control | 24 | 8.4 | |
| Night-break lighted (8:00 p.m. to 10:00 p.m.) | 24 | 10.8 | 32 |
| Night-break lighted (12:00 p.m. to 2:00 a.m.) | 24 | 13.9 | 58 |
| Night-break lighted (4:00 a.m. to 6:00 a.m.) | 24 | 9.2 | 9 |

Table II indicates the effect of night-break light treatment with far-red lights (740 nm) on pod thinning in beans (var. "Red Kidney Beans"). The night-break light treatment with far-red lights (740 nm) was limited to thirty days (from 11:30 p.m. to 2.30 a.m., each day), after the bean had developed five nodes. It was noted that the intensity of 100 $\mu$W/cm$^2$ yielded the highest average total number of pods thinned per plant.

TABLE II

| Treatment | Sample Size | Average Total No. of Pod Thinned/Plant | Relative Percent Pod Thinned |
|---|---|---|---|
| Control | 30 | 7.2 ± 0.49 | |
| 740 nm; 25 $\mu$W/cm$^2$ | 30 | 9.58 ± 0.62 | 26 |
| 740 nm; 100 $\mu$W/cm$^2$ | 30 | 11.16 ± 0.78 | 53 |
| 740 nm; 150 $\mu$W/cm$^2$ | 30 | 10.98 ± 0.81 | 52 |

The field night-break lighting experiments with almonds (var. "Nonpareil" and/or "Merced") were carried out using far-red emitting HID (1500 W potassium mercury lamps with a synthetic resin material filter, such as that sold under the trademark "Plexiglas", placed in front of it to cut off all emissions below 700 nm) lamps. Wide angle fixtures, available commercially from Sylvania as "HIF" series", operated the high-intensity-discharge lamps. All fixtures were mounted on poles about 30 feet above ground level. Replicates at three or four irradiance levels (0.1 $\mu$W/cm$^2$–100 $\mu$W/cm$^2$ as determined by the distance from the light source) were established at different locations within the field. Light irradiances were measured using a Tektronix J-16 photometer radiometer with a J-6512 probe (flat response, ±7 percent from 450 nm to 950 nm). Night-break lighting treatment (4 hours every night: 9 p.m.–1 a.m.) was commenced around the full pink to 5 percent bloom of flower developement. Thinning measurements were made using standard procedures, which involved tagging of randomly selected branches, recording initial flower bud counts, and monitoring fruit set during the light exposure to assess the degree of thinning. In general, far-red night-break lighting treatment was quite effective in thinning of fruitlets and/or fruits as compared to unlighted control groups (dark red kidney bean: 49 percent decrease in pods; almond—var. "Nonpareil": 54 percent reduction in fruitlet and var. "Merced": 25 percent reduction in fruitlet). Fruit and/or nut quality at the time of harvest, and subsequent crop growth and development (including the following year bloom), were not affected adversely by night-break lighting treatment.

Tables III and IV indicate the effect of night-break lighting with far-red lights on thinning of fruit in "old" almond crops for the varieties "Merced" and "Nonpareil", respectively. The experimental designs, in each case, consisted of two blocks of trees with two treatments assigned randomly within each section. Each treatment consisted of four "old" almond (var. "Merced") trees and four "old" almond (var. "Nonpareil") trees, respectively. Flower bud counts were made on Feb. 2, 1981, and night-break lighting was commenced on Feb. 13, 1981.

TABLE III

| Treatment | Av. No. Flower/ Buds Branch | Av. No. of Fruits/ Branch | % Fruit Remaining | Relative Percent Decrease Over Control |
|---|---|---|---|---|
| Control | 81.5 | 26.9 | 33.0 | |
| Lighted 100 $\mu$W/cm$^2$ 6 p.m.–10 p.m. | 95.1 | 23.5 | 24.7 | 25.1 |

TABLE IV

| Treatment | Av. No. of Flower/ Buds Branch | Av. No. of Fruits/ Branch | % Fruit Remaining | Relative Percent Decrease Over Control |
|---|---|---|---|---|
| Control | 76.9 | 16.0 | 20.8 | |
| Lighted 100 μW/cm² 6 p.m.–10 p.m. | 108.8 | 10.3 | 9.5 | 54.5 |

High-intensity-discharge lamps providing light at 740 nm and 760 nm, respectively, can be provided by high and/or low pressure potassium mercury lamps, respectively, the spectral data for such lamps being provided in Table V, below:

TABLE V

POTASSIUM MERCURY LAMPS

| | HIGH PRESSURE | | | LOW PRESSURE | |
|---|---|---|---|---|---|
| λ nm | Output Watts | Percent Output Watts of Total Lamp Output of the Visible Radiation | λ nm | Output Watts | Percent Output Watts of Total Lamp Output of the Visible Radiation |
| 380–400 | 0.07 | 0.44 | 300–400 | 0.12 | 0.48 |
| 400–420 | 0.15 | 0.98 | 400–420 | 0.35 | 1.33 |
| 420–440 | 0.08 | 0.56 | 420–440 | 0.16 | 0.61 |
| 440–460 | 0.10 | 0.65 | 440–460 | 0.18 | 0.68 |
| 460–480 | 0.12 | 0.81 | 460–480 | 0.21 | 0.79 |
| 480–500 | 0.13 | 0.87 | 480–500 | 0.23 | 0.87 |
| 500–520 | 0.14 | 0.91 | 500–520 | 0.23 | 0.89 |
| 520–540 | 0.21 | 1.44 | 520–540 | 0.34 | 1.32 |
| 540–560 | 0.10 | 0.69 | 540–560 | 0.12 | 0.48 |
| 560–580 | 0.35 | 2.34 | 560–580 | 0.31 | 1.18 |
| 580–600 | 0.65 | 4.36 | 580–600 | 0.74 | 2.86 |
| 600–620 | 0.40 | 2.64 | 600–620 | 0.29 | 1.13 |
| 620–640 | 0.50 | 3.32 | 620–640 | 0.32 | 1.23 |
| 640–660 | 0.48 | 3.23 | 640–660 | 0.23 | 0.89 |
| 660–680 | 0.52 | 3.48 | 660–680 | 0.18 | 0.68 |
| 680–700 | 1.19 | 7.94 | 680–700 | 1.37 | 5.26 |
| 700–720 | 1.04 | 6.92 | 700–720 | 0.34 | 1.32 |
| 720–740 | 3.13 | 20.93 | 720–740 | 1.27 | 4.87 |
| 740–760 | 2.51 | 16.74 | 740–760 | 4.11 | 15.84 |
| 760–780 | 0.09 | 0.60 | 760–780 | 7.53 | 28.98 |
| 780–800 | 2.63 | 17.96 | 780–800 | 6.97 | 26.85 |
| 800–820 | 0.39 | 2.62 | 800–820 | 0.38 | 1.45 |
| Based on 250 W lamp, output watts × 2 | | | (Based on 400 W lamp, output watts × 2) | | |

High-intensity-discharge lamps, providing λ emission peaks centered around 740 nm and 760 nm, can be provided that utilize a 1500 W potassium mercury lamp at high pressure and low pressure, respectively. The former is based on a 250 watt high pressure potassium mercury lamp; the latter is based on 400 watts at low pressure. In both cases, a Plexiglas (trademarked brand) FRF-700 filter is used to effectively eliminate light transmission in wavelengths below 690 nm. Spectral data for the high-intensity-discharge lamps, providing λ emission peaks centered around 740 nm and 760 nm are shown in Tables VI and VII, respectively.

TABLE VI

| λ (nm) | Output Watts | Percent Output Watts of Total Lamp Output of the Visible Radiation |
|---|---|---|
| 690–700 | 13.22 | 5.89 |
| 700–720 | 15.54 | 6.92 |
| 720–740 | 47.02 | 20.93 |
| 740–760 | 37.61 | 16.74 |
| 760–780 | 1.36 | 0.60 |
| 780–800 | 39.44 | 17.96 |
| 800–820 | 5.89 | 2.62 |

TABLE VII

| λ (nm) | Output Watts | Percent Output Watts of Total Lamp Output of the Visible Radiation |
|---|---|---|
| 690–700 | 9.08 | 4.66 |
| 700–720 | 2.58 | 1.32 |
| 720–740 | 9.49 | 4.87 |
| 740–760 | 30.85 | 15.84 |
| 760–780 | 56.45 | 28.98 |
| 780–800 | 52.29 | 26.85 |
| 800–820 | 2.83 | 1.45 |

Other high-intensity-discharge light sources with light wattage output emissions centered maximally (i.e., at least 70%) between 740–770 nm may be more efficient than the light sources tested. Night-break lighting with far-red lights given for two to three hours both sides of the middle of the night, and one week after full bloom would also accomplish the objectives of this invention. This invention can be extended to other fruit (peaches, nectarines, apricots, apples, citrus, etc.).

This invention is highly advantageous, in that one is able to thin fruitlets or fruits of economically valuable crops using specific light treatments without causing any adverse effects on plant growth and development. Further, one is able to maintain the integrity of fruit and/or nut harvest quality features, and keep the environment free from hazardous chemical residues. Lights can be applied and removed at any time without the complications arising from the residual amounts of the exogenous stimulus remaining in the plant tissue and soil.

What is claimed is:

1. A method of thinning fruitlets or fruits of crops, wherein said crops are bean crops of the variety "Dark Red Kidney", comprising exposing said crops to far-red night-break lighting at certain stages of flower and fruit growth and development with light selected from the group consisting of fluorescent and high-intensity-discharge, having a λ-emission peak centered around 740 nm and/or 760 nm; wherein said light has an intensity of 25 μW/cm² to 150 μW/cm²; and said night-break lighting is for a period of two hours per night, is applied during the period 11 p.m. to 1 a.m. each day, and is initiated about ten days prior to full bloom of said crops.

* * * * *